March 17, 1964 N. B. ROTHFUSS ETAL 3,124,942
FLEXIBLE COUPLING
Filed Feb. 26, 1962

INVENTORS
NEAL B. ROTHFUSS
HENRY TROEGER

BY Robert W. Ely
ATTORNEY

United States Patent Office 3,124,942
Patented Mar. 17, 1964

3,124,942
FLEXIBLE COUPLING
Neal B. Rothfuss, Clinton, and Henry Troeger, Cooperstown, N.Y., assignors to The Bendix Corporation, Utica, N.Y., a corporation of Delaware
Filed Feb. 26, 1962, Ser. No. 175,689
8 Claims. (Cl. 64—13)

This invention relates to couplings for connecting two shafts and more particularly concerns mechanical couplings so constructed as to connect shafts which are misaligned.

An object of the present invention is to provide an improved flexible coupling which has contoured diaphragms and is particularly adapted to connect a drive shaft and driven shaft which are closely spaced and have a fixed or varying misalignment of a relatively small magnitude.

Another object is the provision of such a flexible coupling which has only metallic load-carrying members and has no sliding or rubbing parts, requiring lubrication.

An additional object is to provide a flexible coupling having contoured diaphragms with tubular axial projections which serve to give rigid connection and proper positioning for the diaphragms.

Another object is to provide a flexible coupling having contoured diaphragms at their radially-inner parts to tubular flanged connector means so that ease of fabrication and assembly and a light-weight unit results.

Figure 1:
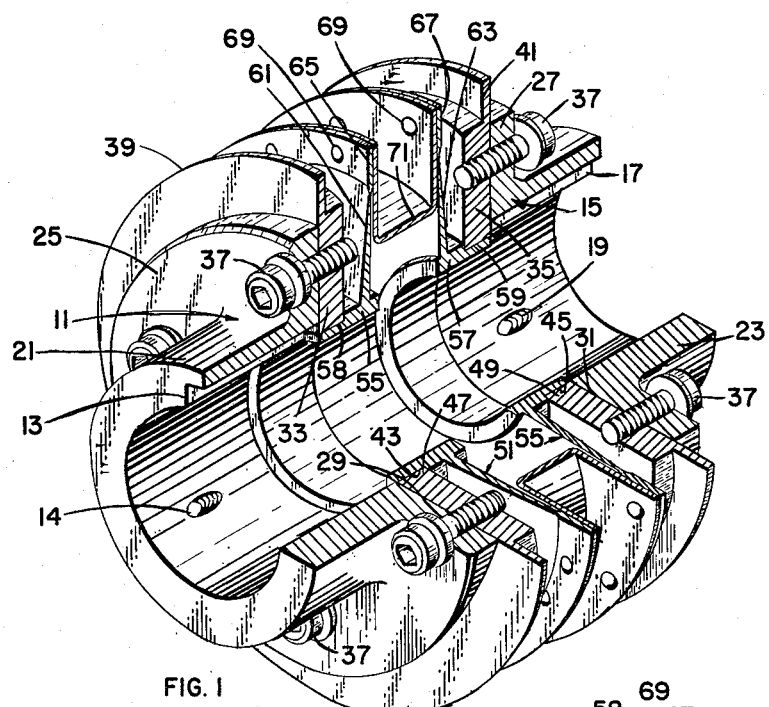
Figures 2, 3:
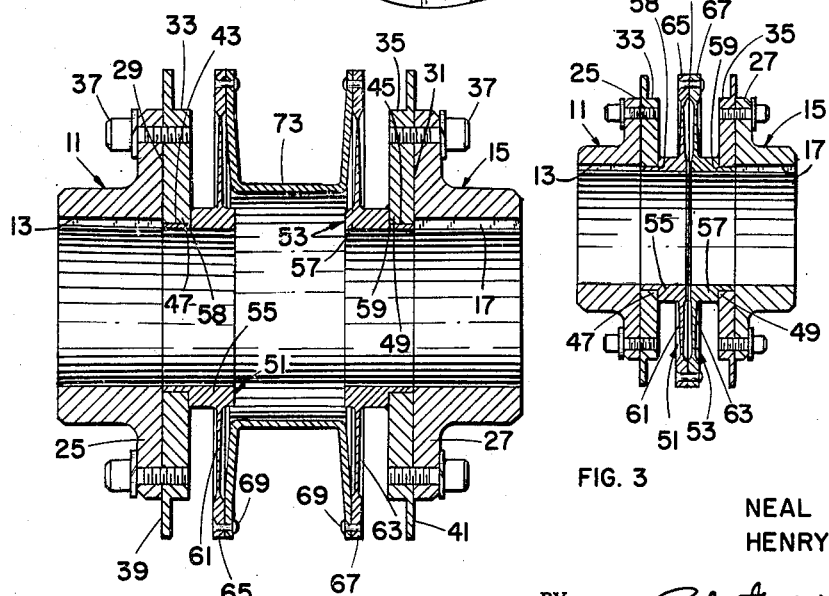

The realization of the above objects along with the features and advantages of the invention will be apparent from the following description and the accompanying drawing in which:

FIGURE 1 is perspective view with a partial longitudinal cross-section of a flexible coupling embodying the invention and shows at each end a tubular connector having a radial flange and flexible means connected thereto which includes two flexible contoured annular discs or diaphragms;

FIGURE 2 is longitudinal cross-sectional view of a coupling which is very similar to the FIGURE 1 coupling and more clearly shows that the contoured diaphragms have radially-inner annular projections extending toward a thick support ring carried by the connectors at each end; and FIGURE 3 is longitudinal cross-sectional view of another coupling on a reduced scale which is identical to the FIGURE 2 coupling except that the circumferential flanges of the contoured disc are directly connected by rivets, rather than through an annular extension member.

Referring to FIGURE 1, the left tubular connector 11 has a keyway 13 and set screw hole 14 which provide for connecting the coupling to a drive shaft. At the right end, another identical connector 15 also has a keyway 17 and a set screw hole 19 for connecting to another shaft which can be the driven shaft relative to the drive shaft attached to connector 11 or the arrangement obviously can be reversed. In either event, one shaft has or assumes during the transmission of torque a slight misalignment which is of the order of about one degree for two flexible diaphragms. The connectors 11 and 15 are arranged on a common axis in axially-spaced relation and have means therebetween which will accommodate the misalignment. Each connector 11 and 15 has a tubular part 21 and 23 respectively extending to the left and to the right away from the radially-outwardly extending flanges 25 and 27 which face each other. These heavy rigid flanges 25 and 27 respectively have flat traverse or radial facing surfaces 29 and 31. Abutting surfaces 29 and 31 are two thick support rings 33 and 35, respectively attached by bolts 37 to the left and right connectors 11 and 15. The support rings 33 and 35 respectively have annular radially-outwardly-projecting guard extensions 39 and 41. The flat-sided rigid rings 33 and 35 have an axial thickness such that extended annular mounting surfaces 43 and 45 are provided. The transverse radially-inner parts of both rings together with the axial extended surfaces 43 and 45 form right-angled mounting corners 47 and 49 at the axially inward sides of the rings.

Two flexible discs or diaphragm elements 51 and 53 respectively have, at the radially-inner part, integral tubular attachment sections 55 and 57 with right-angled ledges 58 and 59 which respectively abut the surfaces of the right-angled mounting corners 47 and 49 of the left and right support rings 33 and 35. Suitable brazes or welds rigidly bond the annular diaphragm elements 51 and 53 at their ledge surfaces to the support rings 33 and 35 so that bending is prevented and a rigid strong attachment is assured. It is apparent that the right-angled corner arrangements having extended bonded surfaces will prevent forces from bending the diaphragm tubular sections 55 and 57 inwardly or outwardly. The flexible diaphragm elements or drive and driven discs 51 and 53 further have contoured or profiled radially-extending sections 61 and 63 and merging outwardly thereof rigid rim sections or circumferential flanges 65 and 67 of uniform thickness. The thin profiled or contoured sections have radially-decreasing cross-sections to give substantially uniform bending and torsional stress.

The circumferential flanges or rim sections 65 and 67 are connected by means of rivets 69 and an annular extension member 71 which has a U-shaped cross-section. Member 71 extends radially-inwardly from the outer edges of the flanges 65 and 67. The rivets 69 extend through the flanges 65 and 67 and the two edge parts of the extension member 71.

In FIGURE 2 wherein a longitudinal cross-section of a flexible coupling essentially the same as the above-described coupling is shown, the same reference numerals are applied to the same parts which correspond except for a slight difference in the larger annular extension member 73. Thus, the two connectors 11 and 15 having keyways 13 and 17 and set screw holes (not shown) are adapted to be connected to slightly misaligned shafts for the transmission of torque. The two support rings 33 and 35 respectively abut the flat surfaces 29 and 31 of the connector radial flanges 25 and 27 and are connected by bolts 37 to give non-bending attachment. The annular diaphragm elements 51 and 53 having their radially-inner tubular sections 55 and 57 bonded to rings 33 and 35 and their outer flanges or rim sections 65 and 67 connected by extension member 73 and rivets 69 provide flexible means between the two connectors 11 and 15 and rigidly connected thereto. Member 73 having an essentially-U-shaped cross-section has its radial walls slightly inclined toward each other from outer edges to accommodate flexing since it extends farther radially inwardly than does member 72. The same rigid bonded connection between the diaphragm elements 51 and 53 and the support rings 33 and 35 is provided by brazing the surfaces of ledges 58 and 59 to the axial surfaces 43 and 45 and the inner part of the radial surfaces at corners 47 and 49 of rings 33 and 35. It can be seen that radial extensions or guards 39 and 41 have the same as or slightly larger diameter than the diaphragm elements 51 and 53 so as to provide protection therefor.

In FIGURE 3, a flexible coupling (which is identical to the FIGURE 2 coupling except for two changes) is shown in reduced scale. The two changes are no extension member is provided (such as member 73) and the facing edges of the tubular sections 55 and 57 of diaphragm elements 51 and 53 have been reduced slightly in axial length to accommodate the flexing of the diaphragm elements which are more closely spaced. All other parts are identical to the FIGURE 2 coupling and have the same reference numerals applied. In the interest of brevity, the description will not be repeated. The FIGURE 3 coupling is, of course, adapted to connect driving and driven shafts or elements when the distance between them is small.

The operation of the disclosed flexible couplings is believed apparent. Thus, when the connectors 11 and 15 are connected by means keys and set screws to a driving element and driven element, flexing of the diaphragm elements 51 and 53 in their contoured sections 61 and 63 will accommodate slight misalignment whether due to fixed or varying conditions such as non-rigid supports and set-up errors and tolerances, or such as sag, vibration or thermal expansions. In transmitting torque, the unit will not introduce any torsional vibrations, nor will it amplify any already present. It is to be noted that all load carrying members are metallic (steel) and, since there is no sliding or rubbing surfaces, the coupling does not require lubrication. A constant velocity results and there is zero backlash. Further, a relative lightweight unit is provided and, since the contoured discs or diaphragm elements 51 and 53 have axial projections 55 and 57 which provide for attachment, the discs are easily fabricated and assembled for a strong connection. The thick flat support rings 33 and 35 having their right-angled corners 47 and 49 with extended axial annular-surfaces 43 and 45 contribute to a rigid construction in cooperation with diaphragm mounting ledges 58 and 59 and the flat-sided radial flanges 25 and 27. This arrangement further gives ease in assembly and assures that the diaphragms extend perpendicularly in relation to the common axis and thus are uniformly flexed when coupling is in use.

It is to be understood that changes can be made in the disclosed embodiment of the invention by persons skilled in the art without departing from the invention as set forth in the following claims.

What is claimed is:

1. A flexible coupling for two shafts having a fixed or varying misalignment comprised of:
   first tubular connector means having structure for attaching to a driving shaft,
   second connector tubular means having structure for attaching to a driven shaft,
   said first and second connector means being arranged on a common axis,
   flexible diaphragm means arranged between and connecting said first and second connector means,
   said flexible diaphragm means including a plurality of annular diaphragm elements,
   each of said diaphragm elements having a circumferential flange and inwardly thereof a contoured section having radially-outwardly-decreasing thickness such that substantially uniform bending and torsional stress results,
   the radially-inner part of the diaphragm element adjacent said first connector means having indented side structure facing said first connector,
   the radially-inner part of said first connector means having mating structure received in and rigidly connected to said facing indented side structure of said diaphragm element adjacent thereto,
   the radially-inner part of the diaphragm element adjacent said second connector means having indented structure facing said second connector, and
   the radially-inner part of said second connector means having mating structure received in and rigidly connected to said facing indented side structure of said diaphragm element adjacent thereto.

2. A flexible coupling for two shafts having a fixed or varying misalignment comprised of:
   first tubular connector means having structure for attaching to a driving shaft,
   second connector tubular means having structure for attaching to a driven shaft,
   said first and second connector means being arranged on a common axis,
   flexible diaphragm means arranged between and connecting said first and second connector means,
   said flexible diaphragm means including a plurality of annular diaphragm elements,
   each of said diaphragm elements having a circumferential flange and inwardly thereof a contoured section having radially-outwardly-decreasing thickness such that substantially uniform bending and torsional stress results,
   the radially inner part of the diaphragm element adjacent said first connector means having indented side structure facing said first connector,
   the radially inner part of said first connector means having mating structure received in and rigidly connected to said facing indented side structure of said diaphragm element adjacent thereto,
   the radially inner part of the diaphragm element adjacent said second connector means having indented structure facing said second connector,
   the radially inner part of said second connector means having mating structure received in and rigidly connected to said facing indented side structure of said diaphragm element adjacent thereto,
   said indented structure of said diaphragm elements being a right-angled annular ledge formed in a tubular section, and
   said mating structure of said first and second connector means being an annular right-angled corner having an extended axial surface contacting the adjacent ledge.

3. A flexible coupling for two shafts having a fixed or varying misalignment comprised of:
   first tubular connector means having structure for attaching to a driving shaft,
   second connector tubular means having structure for attaching to a driven shaft,
   said first and second connector means being arranged on a common axis,
   flexible diaphragm means arranged between and connecting said first and second connector means,
   said flexible diaphragm means including a plurality of annular diaphragm elements,
   each of said diaphragm elements having a circumferential flange and inwardly thereof a contoured section having radially-outwardly-decreasing thickness such that substantially uniform bending and torsional stress results,
   the radially inner part of the diaphragm element adjacent said first connector means having indented side structure facing said first connector,
   the radially inner part of said first connector means having mating structure received in and rigidly connected to said facing indented side structure of said diaphragm element adjacent thereto,
   the radially inner part of the diaphragm element adjacent said second connector means having indented structure facing said second connector,
   the radially inner part of said second connector means having mating structure received in and rigidly connected to said facing indented side structure of said diaphragm element adjacent thereto, said indented structure of said diaphragm elements being a right-angled annular ledge formed in a tubular section, said mating structure of said first and second connector means being an annular right-angled corner having an extended axial surface contacting the adjacent ledge, and each of said connector means including an annular support ring having one of said right-angled corners and a flat radial face and further including a radially-extending flange connected to said support ring and having a surface abutting said flat radial face.

4. A flexible coupling for drive and driven shafts having a fixed or varying misalignment comprised of:

a drive tubular connector having a radial outwardly-extending flange and attachment means for a drive shaft, a driven tubular connector having a radial outwardly-extending flange and attachment means for a driven shaft, said drive and driven connectors being axially aligned and having said flanges in spaced facing relation providing flat radial facing surfaces, each of said connectors having a thick annular support ring with a flat radial face abutting said radial surface of its flange and fasteners extending through said radial flange and said support ring, a flexible diaphragm assembly having a contoured disc adjacent said support ring of said drive connector and another contoured disc adjacent said support ring of said driven connector to provide respectively a drive disc and a driven disc, said drive and driven discs each including axially projecting structure at the radially inner part thereof extending toward the respective radially inner part of the adjacent support ring, the radially inner part of the axially inward side of said support rings having mating structure contacting said axially projecting structure of the adjacent drive and driven discs, and said rings and said drive and driven discs being rigidly connected at the respective projecting structure of said discs and the respective mating structure of said rings.

5. A flexible coupling for drive and driven shafts having a fixed or varying misalignment comprised of:

a drive tubular connector having a radial outwardly-extending flange and attachment means for a drive shaft, a driven tubular connector having a radial outwardly-extending flange and attachment means for a driven shaft, said drive and driven connectors being axially aligned and having said flanges in spaced facing relation providing flat radial facing surfaces, each of said connectors having a thick annular support ring with a flat radial face abutting said radial surface and fasteners extending through said radial flange and said support ring, said support rings each having right-angled radially-inner corners with an extended annular axial surface at the axially inward side thereof, a flexible diaphragm assembly having a contoured disc adjacent said support ring of said drive connector shaft and another contoured disc adjacent said support ring of said driven connector shaft to provide respectively a drive disc and a driven disc, said drive and driven discs each including an axial projection having an annular mounting ledge which receives in abutting relation the right-angled corner of the adjacent support ring, said rings and said drive and driven discs being bonded together at surfaces of said right-angled corners and said mounting ledges, each of said mounting ledges having its axial-extending surface with a length equal to the length of the extended annular surface of the right-angled corner of the respective support ring.

6. A flexible coupling comprised of:

first and second annular diaphragm members arranged on a common axis in axial spaced relation with facing sides and end sides, each of said annular diaphragm members having at its inner edge a tubular projection extending axially from its end side, each of said annular diaphragm members having a contoured section of radially-decreasing thickness and a circumferential flange merging from the contoured section to a uniform thickness, the axially-outer end of each of said tubular projections having a reduced-diameter end part providing an annular mounting ledge, each of said mounting ledges having annular surface and transverse radial face, first and second tubular means having right-angled inner annular corners respectively mounted on said ledge surfaces and abutting said radial faces and bonded respectively to said tubular projections, and means connecting said diaphragm members at their circumferential flanges.

7. A flexible coupling comprised of:

first and second annular diaphragm members arranged on a common axis in axial spaced relation with facing sides and end sides, each of said annular diaphragm members having at its inner edge a tubular projection extending axially from its end side, each of said annular diaphragm members having a contoured section of radially-decreasing thickness and a circumferential flange merging from the contoured section to a uniform thickness, the axially-outer end of each of said tubular projections having a reduced-diameter end part providing an annular mounting ledge, each of said mounting ledges having annular surface and transverse radial face, first and second tubular means having right-angled inner annular corners respectively mounted on said ledge surfaces and abutting said radial faces and bonded respectively to said tubular projections, means connecting said diaphragm members at their circumferential flanges, and said means connecting said diaphragm members including an annular extension member having a U-shaped cross-section within the periphery of said diaphragm members and so dimensioned and constructed as to accommodate flexing of said diaphragm members.

8. A flexible coupling comprised of:

first and second annular diaphragm members arranged on a common axis in axial spaced relation with facing sides and end sides, each of said annular diaphragm members having at its inner edge a tubular projection extending axially from its end side, each of said annular diaphragm members having a contoured section of radially-decreasing thickness and a circumferential flange merging from the contoured section to a uniform thickness, the axially-outer end of each of said tubular projections having a reduced-diameter end part providing an annular mounting ledge, each of said mounting ledges having annular surface and transverse radial face, first and second tubular means having right-angled inner annular corners respectively mounted on said ledge surfaces and abutting said radial faces and bonded respectively to said tubular projections, means connecting said diaphragm members at their circumferential flanges, each of said tubular means including a tubular connector having a radial flange and a support ring abutting and connected to said radial flange and providing said annular corner mounted in the respective ledge, each of said support rings having peripheral guard extension means arranged to protect outer edge of the adjacent diaphragm members.

References Cited in the file of this patent
UNITED STATES PATENTS

| | | |
|---|---|---|
| 1,602,983 | Ljungstrom | Oct. 12, 1926 |
| 1,639,644 | Baumann | Aug. 23, 1927 |
| 2,550,580 | McLeod et al. | Apr. 24, 1951 |
| 2,647,380 | Troeger et al. | Aug. 4, 1953 |